(12) United States Patent
Froehlich

(10) Patent No.: US 11,077,730 B2
(45) Date of Patent: Aug. 3, 2021

(54) SENSOR MOUNTING HEIGHT ESTIMATION USING LOAD SENSORS

(71) Applicant: Continental Automotive Systems Inc., Auburn Hills, MI (US)

(72) Inventor: Dominik Froehlich, Ferndale, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 287 days.

(21) Appl. No.: 16/394,058

(22) Filed: Apr. 25, 2019

(65) Prior Publication Data
US 2020/0207166 A1    Jul. 2, 2020

Related U.S. Application Data

(60) Provisional application No. 62/785,272, filed on Dec. 27, 2018.

(51) Int. Cl.
*B60D 1/36* (2006.01)
*B60W 40/13* (2012.01)
*B60R 11/04* (2006.01)
*B60C 23/02* (2006.01)

(52) U.S. Cl.
CPC .............. *B60D 1/36* (2013.01); *B60R 11/04* (2013.01); *B60W 40/13* (2013.01); *B60C 23/02* (2013.01); *B60W 2530/10* (2013.01)

(58) Field of Classification Search
CPC ..... B60D 1/36; B60W 40/13; B60W 2530/10; B60R 11/04; B60C 23/02
See application file for complete search history.

(56) References Cited

U.S. PATENT DOCUMENTS

| | | | |
|---|---|---|---|
| 7,195,267 B1* | 3/2007 | Thompson | B60D 1/36 280/477 |
| 7,568,716 B2* | 8/2009 | Dietz | B60D 1/36 280/477 |
| 8,888,121 B2* | 11/2014 | Trevino | B60D 1/62 280/477 |
| 9,457,632 B1* | 10/2016 | Windeler | B60D 1/36 |

(Continued)

FOREIGN PATENT DOCUMENTS

| DE | 102014014248 A1 | 3/2015 |
|---|---|---|
| FR | 3013835 A1 | 5/2015 |

(Continued)

OTHER PUBLICATIONS

International Search Report and Written Opinion dated Mar. 25, 2020 from corresponding International Patent Application No. PCT/US2019/064276.

*Primary Examiner* — Ramsey Refai

(57) ABSTRACT

A method and apparatus for a method that includes providing at least one sensor mounted to a structure on a vehicle. The at least one sensor is located at a sensor height relative to ground level. A first object is located on the vehicle at a fixed distance from the at least one sensor and at a variable distance from ground level. The variable distance estimated as a function of a vehicle load. The sensor height adjusted based on the variable distance to account for any changes in the vehicle load. A second object is spaced at a vertical distance from ground level. An adjusted sensor height used for comparison to the vertical distance of the second object from ground level.

20 Claims, 1 Drawing Sheet

(56) References Cited

U.S. PATENT DOCUMENTS

| | | | | |
|---|---|---|---|---|
| 10,906,583 B2* | 2/2021 | Li | | G05D 1/0088 |
| 2003/0234512 A1* | 12/2003 | Holub | | B60D 1/36 |
| | | | | 280/432 |
| 2004/0252019 A1* | 12/2004 | Paull | | B60D 1/36 |
| | | | | 340/431 |
| 2011/0216199 A1* | 9/2011 | Trevino | | B60D 1/36 |
| | | | | 348/148 |
| 2016/0378118 A1* | 12/2016 | Zeng | | B60D 1/62 |
| | | | | 701/28 |
| 2017/0254694 A1 | 9/2017 | Toigo | | |

FOREIGN PATENT DOCUMENTS

| | | | |
|---|---|---|---|
| WO | 03029764 | A1 | 4/2003 |
| WO | 2016164118 | A2 | 10/2016 |

* cited by examiner

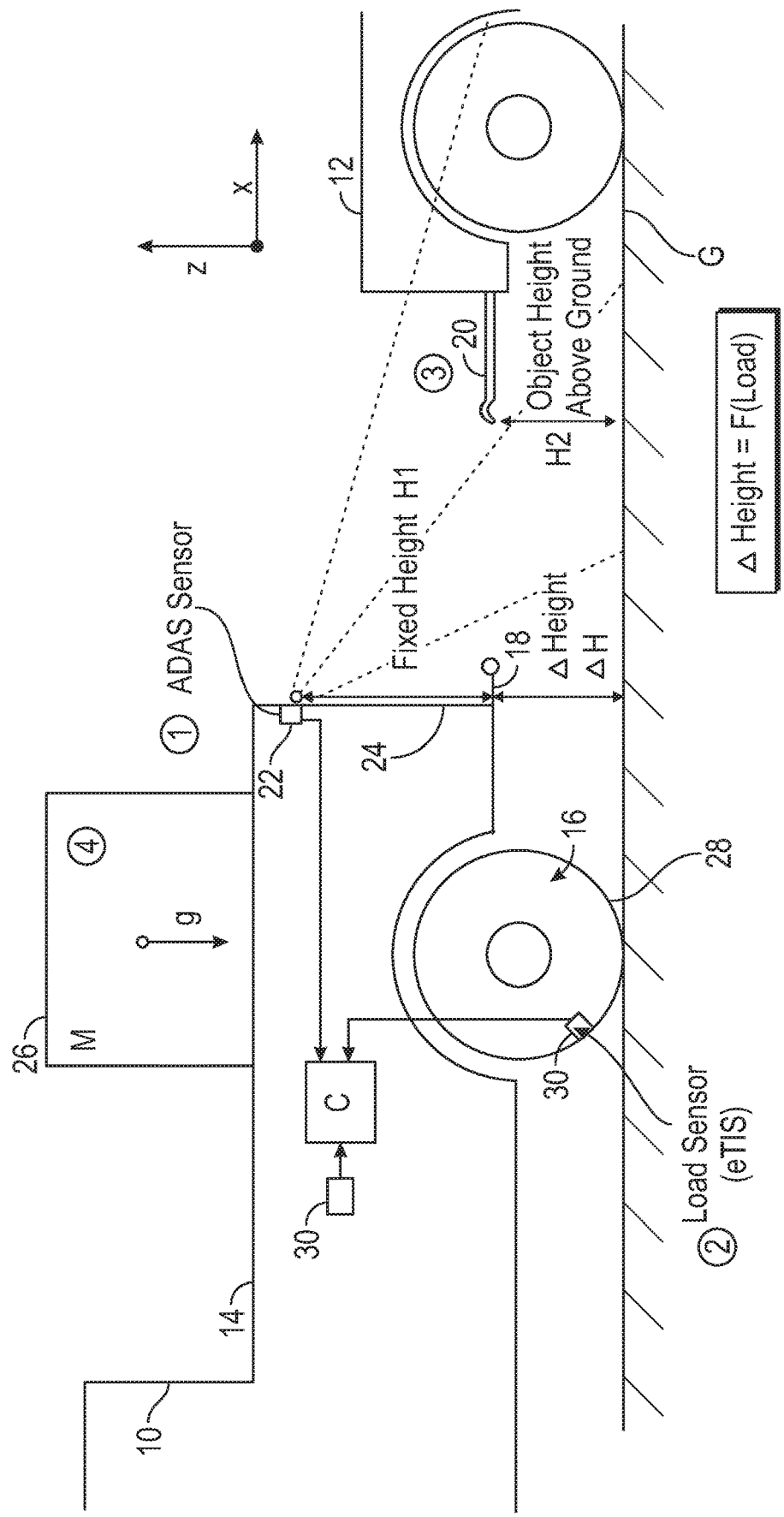

SENSOR MOUNTING HEIGHT ESTIMATION USING LOAD SENSORS

PRIORITY CLAIM

This application claims the benefit of U.S. Provisional Application No. 62/785,272 filed on Dec. 27, 2018.

TECHNICAL FIELD

The subject invention is a method and apparatus that uses a sensor on a vehicle to estimate a height of an object relative to ground level that can vary based on load changes.

BACKGROUND

Advanced driver-assistance systems (ADAS) include various different types of vehicle systems that help the driver with the driving process. These intelligent systems use many different sensors to automate, adapt, and enhance vehicle systems for safety and better driving. For example, in certain situations, it is important to know a height of an object on or near a vehicle relative to ground. When hitching a trailer to a vehicle, for example, it is important to know a height of a trailer hitch and/or a trailer receiver from the ground to determine whether a receiver on a trailer will be in proper alignment with the hitch on the vehicle. However, external factors, such as different loads in the vehicle for example, can vary the distance of the trailer hitch to the ground, which can reduce the accuracy of sensor readings used to determine the heights of the receiver and/or hitch.

SUMMARY

In one exemplary embodiment, a method provides at least one sensor mounted to a structure on a vehicle. The at least one sensor is located at a sensor height relative to ground level. A first object is located on the vehicle at a fixed distance from the at least one sensor and at a variable distance from ground level. The variable distance estimated as a function of a vehicle load. The sensor height adjusted based on the variable distance to account for any changes in the vehicle load. A second object is spaced at a vertical distance from ground level. An adjusted sensor height used for comparison to the vertical distance of the second object from ground level.

In another embodiment according to the previous embodiment, the first object comprises a trailer hitch and the second object comprises a trailer receiver, and wherein the method includes comparing the variable distance of the first object to the vertical distance of the second object.

In another embodiment according to any of the previous embodiments, at least one sensor comprises at least one camera.

In another embodiment according to any of the previous embodiments, the structure comprises a tailgate or a liftgate.

In another embodiment according to any of the previous embodiments, a controller is configured to estimate the variable distance as a function of the vehicle load by determining a weight of the vehicle load.

In another embodiment according to any of the previous embodiments, the method includes determining a weight of the vehicle load is accomplished by using at least one tire load or pressure sensor that is in communication with the controller.

In another embodiment according to any of the previous embodiments, the at least one tire load or pressure sensor is part of an electronic tire information system.

In another embodiment according to any of the previous embodiments, the vehicle load is located in a cargo area that is supported by rear tires of the vehicle, and wherein the at least one tire load sensor comprises a plurality of tire load sensors with at least one tire load sensor being associated with each rear tire, and wherein the method includes using the tire load or pressure sensors in the rear tires to estimate a load per rear tire, and using an average load on the rear tires to estimate the variable distance.

In another embodiment according to any of the previous embodiments, the vehicle load is located in a cargo area that is supported by rear tires of the vehicle, and wherein the at least one tire load sensor comprises a plurality of tire load sensors with at least one tire load sensor being associated with each rear tire, and wherein the method includes using the tire load or pressure sensors in the rear tires to estimate a load per rear tire, and using a measured load for all rear tires to estimate the variable distance.

In another exemplary embodiment, an apparatus includes at least one sensor mounted to a structure on a vehicle. The at least one sensor is located at a sensor height relative to ground level. A first object is located on the vehicle at a fixed distance from the at least one sensor and at a variable distance from ground level. A second object is spaced at a vertical distance from ground level. A controller is configured to estimate the variable distance as a function of a vehicle load, adjust the sensor height based on the variable distance to account for any changes in the vehicle load, and using an adjusted sensor height for comparison to the vertical distance.

In another embodiment according to any of the previous embodiments, the first object comprises a trailer hitch and the second object comprises a trailer receiver, and wherein the controller compares the variable distance to the vertical distance to determine whether the trailer hitch and trailer receiver are in alignment with each other in a longitudinal direction.

In another embodiment according to any of the previous embodiments, the structure comprises a tailgate or a liftgate.

In another embodiment according to any of the previous embodiments, the at least one sensor is positioned near an upper edge of the tailgate or liftgate, and wherein the trailer hitch is located on a lower edge of the tailgate or liftgate, and wherein the fixed distance the variable distance are added together to determine a distance of the at least one sensor from ground level.

In another embodiment according to any of the previous embodiments, the controller is configured to estimate the variable distance as a function of the vehicle load by determining a weight of the vehicle load.

In another embodiment according to any of the previous embodiments, the apparatus includes at least one tire load or pressure sensor, and wherein the controller is configured to determine a weight of the vehicle load by using data from the at least one tire load or pressure sensor.

In another embodiment according to any of the previous embodiments, the at least one tire load or pressure sensor is part of an electronic tire information system that is in communication with the controller.

In another embodiment according to any of the previous embodiments, the vehicle load is located in a cargo area that is supported by rear tires of the vehicle, and wherein the at least one tire load or pressure sensor comprises a plurality of tire load or pressure sensors with at least one tire load or pressure sensor being associated with each rear tire, and wherein the controller uses the data from the tire load or pressure sensors in the rear tires to estimate a load per rear tire, and uses an average load on the rear tires to estimate the variable distance.

In another embodiment according to any of the previous embodiments, the vehicle load is located in a cargo area that is supported by rear tires of the vehicle, and wherein the at least one tire load or pressure sensor comprises a plurality of tire load or pressure sensors with at least one tire load or pressure sensor being associated with each rear tire, and wherein the controller uses the data from the tire load or pressure sensors in the rear tires to estimate a load per rear tire, and uses a measured load for all rear tires to estimate the variable distance.

In another embodiment according to any of the previous embodiments, the controller adjusts the variable distance based on changes in the vehicle load to provide an adjusted distance of the at least one sensor from ground level, and subsequently compares the vertical distance of the second object from ground level to an adjusted variable distance.

In another embodiment according to any of the previous embodiments, the at least one sensor comprises at least one camera.

BRIEF DESCRIPTION OF THE DRAWINGS

The disclosure can be further understood by reference to the following detailed description when considered in connection with the accompanying drawings wherein:

FIG. 1 is a schematic illustration of a vehicle and a trailer with a height estimation system that incorporates the subject invention.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION OF AN EMBODIMENT

FIG. 1 shows a vehicle 10 and a trailer 12 that is to be hitched to the vehicle 10. In this example, the vehicle 10 is a pick-up truck and includes a cargo bed 14 that extends over a pair of rear wheels 16 (only one rear wheel is shown). The vehicle 10 includes a tow-ball or hitch 18 that is coupled to a receiver 20 on the trailer 12. At least one ADAS sensor 22 is located on a rear structure 24 of the vehicle 10. In this example, the rear structure 24 comprises a tailgate; however, the rear structure could also comprise a liftgate or other similar structure. ADAS sensors 22 can comprise one or more of a motion sensor, an optical camera sensor, a radar sensor, a lidar sensor, a laser sensor and/or an ultrasonic sensor, for example. In this example, the ADAS sensor 22 includes at least one optical camera sensor.

FIG. 1 shows a vertical direction Z and a horizontal or longitudinal direction X, i.e. a direction of travel. The hitch 18 is typically located at a lower edge of the vehicle body and extends outward from a vehicle frame or chassis in the longitudinal direction X. The ADAS sensor 22 is mounted near an upper edge of the tailgate and has a known fixed height H1 relative to the hitch 18 or lower edge of the vehicle body in the vertical direction Z. There is also a variable height ΔH between the hitch 18 or lower edge of the vehicle body to the ground G. This height ΔH can vary as a result of a load 26 that that is placed in the cargo bed 14. Heavier loads decrease the height ΔH, and when a load is lightened, the height ΔH can increase. The receiver 20 extends out from the trailer 12 in the longitudinal direction X toward the hitch 18. The receiver 20 is located at a height H2 above the ground G that is known or measured.

Cameras and other vision-based sensors can be used to estimate the height of objects above the ground G that are remotely located from the vehicle 10, e.g. the trailer receiver 20. One example method and system for determining the height of objects above the ground that are remotely located from the vehicle 10 is found in U.S. Ser. No. 16/364,151, which is assigned to the same assignee and which is hereby incorporated by reference.

In the disclosed example, the ADAS sensor 22 is used to determine if the hitch 18 is in alignment with the receiver 20 such that the hitch 18 will collide with the receiver 20 to connect the trailer 12 to the vehicle 10. For this determination, the vertical position of the hitch 18 and the receiver 20 relative to the ground G have to be known with high accuracy. Monocular cameras are the preferred type of sensor in this situation as they are used to implement a multitude of functions such as automated trailer-hitching, trailer reverse assistance, a rear view for the driver, etc.

In order to accurately estimate the height of objects above the ground G with such sensors, the effective height of the sensor 22 above ground must be known. The effective height of the sensor 22 relative to ground G is determined by the fixed mounting height H1 between the sensor 22 and the hitch 18 on the frame or chassis, which is then added to the variable height ΔH. The variable height component is a function of the load of the vehicle. The system detects any changes in the height of the sensor 22 relative to the ground G due to changes in load 26.

As discussed above, the load is located in the cargo bed 14 that is supported by the rear wheels 16. Each wheel 16 includes a tire 28. In one example, a load or pressure sensor 30 in the rear tires 28 is used to estimate the load per tire 28. Each rear tire 28 includes at least one load or pressure sensor 30. A load or pressure sensor for the rear tire that is not shown in FIG. 1, is indicated schematically at 30a. Each tire load or pressure sensor 30, 30a communicates tire pressure or load data to a controller C. For example, the controller C can monitor tire pressure over time to determine any changes as a result of a cargo load increase or decrease. Thus, the system is set with a first or initial height for ΔH and then adjusts this height ΔH based on changes to the cargo load.

In a simple solution example, the system uses an average load on the rear tires 28 to estimate the sensor height (H1+ΔH) for the rear sensor 22, e.g. the camera. In a more complex solution example, the measured load for all tires is used. The sensor height (H1+ΔH) is therefore continuously adjusted in response to changes in the variable height ΔH. This significantly improves the accuracy of the sensor height, which then allows the sensor 22 to make more accurate comparisons of the variable height to the height H2.

In one example, the system uses the camera sensor 22 to estimate the height of the receiver 20, e.g. to estimate the height H2 of the receiver 20, relative to ground level G. The camera sensor 22 and pressure sensors 30, 30a communicate data to the system controller C. The system uses the load data from the load or pressure sensors 30 to determine the variable height ΔH, which is then added to the fixed height H1 to determine the actual real-time height of the sensor 22 from the ground G. Thus, the accuracy of the sensor 22 is improved because its height relative to ground G has been corrected to adjust for the load 26. Thus, its readings to determine the height H2 of the receiver 20 relative to ground are more accurate. Further, the determination of the variable height ΔH of the hitch 18 relative to ground G for comparison to the receiver height H2 is more accurate because the variable height ΔH accounts for the changes in the load 26.

In one example, the load sensors 30 are part of an electronic tire information system (eTIS). This system is an electronic system that uses tire sensors to monitor tire air pressure, load, etc. Using the sensors from this system reduces cost as additional load sensors are not required. The controller C can be part of the eTIS or can be a separate controller that is in communication with the eTIS.

The subject invention provides for improved accuracy over prior designs because the height of the camera sensor 22 is corrected or adjusted based on vehicle load information.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

The invention claimed is:

1. A method comprising:
providing at least one sensor mounted to a structure on a vehicle, the at least one sensor being located at a sensor height relative to ground level;
locating a first object on the vehicle at a fixed distance from the at least one sensor and at a variable distance from ground level;
estimating the variable distance as a function of a vehicle load;
adjusting the sensor height based on the variable distance to account for any changes in the vehicle load;
spacing a second object at a vertical distance from ground level; and
using an adjusted sensor height for comparison to the vertical distance of the second object from ground level.

2. The method according to claim 1, wherein the first object comprises a trailer hitch and the second object comprises a trailer receiver, and wherein the method includes comparing the variable distance of the first object to the vertical distance of the second object.

3. The method according to claim 1, wherein the at least one sensor comprises at least one camera.

4. The method according to claim 1, wherein the structure comprises a tailgate or a liftgate.

5. The method according to claim 1, including a controller that is configured to estimate the variable distance as a function of the vehicle load by determining a weight of the vehicle load.

6. The method according to claim 5, wherein determining a weight of the vehicle load is accomplished by using at least one tire load or pressure sensor that is in communication with the controller.

7. The method according to claim 6, wherein the at least one tire load or pressure sensor is part of an electronic tire information system.

8. The method according to claim 7, wherein the vehicle load is located in a cargo area that is supported by rear tires of the vehicle, and wherein the at least one tire load sensor comprises a plurality of tire load sensors with at least one tire load sensor being associated with each rear tire, and wherein the method includes using the tire load or pressure sensors in the rear tires to estimate a load per rear tire, and using an average load on the rear tires to estimate the variable distance.

9. The method according to claim 7, wherein the vehicle load is located in a cargo area that is supported by rear tires of the vehicle, and wherein the at least one tire load sensor comprises a plurality of tire load sensors with at least one tire load sensor being associated with each rear tire, and wherein the method includes using the tire load or pressure sensors in the rear tires to estimate a load per rear tire, and using a measured load for all rear tires to estimate the variable distance.

10. An apparatus comprising:
at least one sensor mounted to a structure on a vehicle, the at least one sensor being located at a sensor height relative to ground level;
a first object located on the vehicle at a fixed distance from the at least one sensor and at a variable distance from ground level;
a second object spaced at a vertical distance from ground level; and
a controller configured to
estimate the variable distance as a function of a vehicle load,
adjust the sensor height based on the variable distance to account for any changes in the vehicle load, and
using an adjusted sensor height for comparison to the vertical distance.

11. The apparatus according to claim 10, wherein the first object comprises a trailer hitch and the second object comprises a trailer receiver, and wherein the controller compares the variable distance to the vertical distance to determine whether the trailer hitch and trailer receiver are in alignment with each other in a longitudinal direction.

12. The apparatus according to claim 11, wherein the structure comprises a tailgate or a liftgate.

13. The apparatus according to claim 12, wherein the at least one sensor is positioned near an upper edge of the tailgate or liftgate, and wherein the trailer hitch is located on a lower edge of the tailgate or liftgate, and wherein the fixed distance the variable distance are added together to determine a distance of the at least one sensor from ground level.

14. The apparatus according to claim 13, wherein the controller is configured to estimate the variable distance as a function of the vehicle load by determining a weight of the vehicle load.

15. The apparatus according to claim 14, including at least one tire load or pressure sensor, and wherein the controller is configured to determine a weight of the vehicle load by using data from the at least one tire load or pressure sensor.

16. The apparatus according to claim 15, wherein the at least one tire load or pressure sensor is part of an electronic tire information system that is in communication with the controller.

17. The apparatus according to claim 16, wherein the vehicle load is located in a cargo area that is supported by rear tires of the vehicle, and wherein the at least one tire load or pressure sensor comprises a plurality of tire load or pressure sensors with at least one tire load or pressure sensor being associated with each rear tire, and wherein the controller uses the data from the tire load or pressure sensors in the rear tires to estimate a load per rear tire, and uses an average load on the rear tires to estimate the variable distance.

18. The apparatus according to claim 16, wherein the vehicle load is located in a cargo area that is supported by rear tires of the vehicle, and wherein the at least one tire load or pressure sensor comprises a plurality of tire load or pressure sensors with at least one tire load or pressure sensor being associated with each rear tire, and wherein the controller uses the data from the tire load or pressure sensors in the rear tires to estimate a load per rear tire, and uses a measured load for all rear tires to estimate the variable distance.

19. The apparatus according to claim 15, wherein the controller adjusts the variable distance based on changes in the vehicle load to provide an adjusted distance of the at least one sensor from ground level, and subsequently compares the vertical distance of the second object from ground level to an adjusted variable distance.

20. The apparatus according to claim 10, wherein the at least one sensor comprises at least one camera.

\* \* \* \* \*